(12) United States Patent
Kensicher et al.

(10) Patent No.: US 8,263,819 B2
(45) Date of Patent: Sep. 11, 2012

(54) METHOD FOR MANUFACTURING A METALLIC HYDROXIDE AND OXIDE POWDER WHICH IS SELF-DISPERSING IN WATER, POWDER AND AQUEOUS DISPERSION OBTAINED, USES THEREOF

(75) Inventors: Yves Kensicher, Theize (FR); Jean Moro, Saint Didier de Formans (FR); Jean-Marc Suau, Lucenay (FR)

(73) Assignee: Coatex S.A.S., Genay (FR)

( * ) Notice: Subject to any disclaimer, the term of this patent is extended or adjusted under 35 U.S.C. 154(b) by 641 days.

(21) Appl. No.: 12/522,353

(22) PCT Filed: Dec. 11, 2007

(86) PCT No.: PCT/IB2007/003933
§ 371 (c)(1),
(2), (4) Date: Jul. 7, 2009

(87) PCT Pub. No.: WO2008/084317
PCT Pub. Date: Jul. 17, 2008

(65) Prior Publication Data
US 2010/0121127 A1 May 13, 2010

(30) Foreign Application Priority Data
Jan. 9, 2007 (FR) .................................... 07 00086

(51) Int. Cl.
*A62D 3/33* (2007.01)

(52) U.S. Cl. .......................... 588/315; 502/300; 502/439
(58) Field of Classification Search .................. 588/315; 502/300, 439
See application file for complete search history.

(56) References Cited

U.S. PATENT DOCUMENTS

| 4,818,783 A | 4/1989 | Shioji et al. |
| 5,681,876 A | 10/1997 | Schneider et al. |

FOREIGN PATENT DOCUMENTS

| EP | 0 594 332 | 4/1994 |
| EP | 0 751 189 | 1/1997 |

*Primary Examiner* — Edward Johnson
(74) *Attorney, Agent, or Firm* — Oblon, Spivak, McClelland, Maier & Neustadt, L.L.P.

(57) ABSTRACT

The invention resides in a method for manufacturing a metallic hydroxide-based and metallic oxide-based powder, which is self-dispersing in water, characterized in that a metallic oxide powder is partially treated with a polymer in the form of an aqueous emulsion and/or solution, in such a way that the level of metallic hydroxide by dry weight within said treated powder is less than 99% of its total weight, and in that said polymer is a water-soluble homopolymer or copolymer containing at least one vinylic monomer. In one particular variant, the polymer is a water-soluble copolymer containing a vinylic monomer and a non-ionic monomer, and the metal is calcium and/or magnesium. The invention also pertains to the powders obtained, their uses in aqueous suspensions, in treating waste, as a chemical additive, or as a soil amendment.

84 Claims, 2 Drawing Sheets

METHOD FOR MANUFACTURING A METALLIC HYDROXIDE AND OXIDE POWDER WHICH IS SELF-DISPERSING IN WATER, POWDER AND AQUEOUS DISPERSION OBTAINED, USES THEREOF

The present invention pertains to the field of methods for placing metallic hydroxides, preferentially including calcium hydroxides and magnesium hydroxides which are particularly used as chemical neutralization agents, into aqueous dispersions.

The Applicant notes that in the present Application, the term "metal" denotes a chemical element that can form metallic bonds and lose electrons in order to form cations (positive ions) and form ionic bonds in the case of alkaline metals. In the periodic table of elements, the diagonal line running from aluminum to bismuth separates the metallic elements (on the lower-left side of this line, including the elements that make up the line) from the non-metallic elements (on the upper-right side of the line).

Manufacturing aqueous suspensions and dispersions containing a metallic hydroxide, itself based on a metallic oxide, corresponds to the reaction from hydrating the metallic oxide so as to obtain the corresponding hydroxide.

Calcium hydroxide ($Ca(OH)_2$), also known as hydrated lime, and magnesium hydroxide ($Mg(OH)_2$), which form the two very preferential hydroxides covered by the present Application, are conventionally obtained by hydrating calcium oxide (CaO), also known as quicklime, and magnesium oxide (MgO), based on the following reactions:

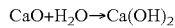

$$CaO + H_2O \rightarrow Ca(OH)_2$$

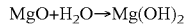

$$MgO + H_2O \rightarrow Mg(OH)_2$$

Calcium hydroxide and magnesium hydroxide may be used as chemical neutralization agents, which gives them numerous uses, among them treating industrial or household waste (potentially gaseous waste, such as acidic fumes), their use as a chemical additive (i.e. as an additive which takes part in a chemical reaction intended to obtain a product: for example, this is true of calcium hydroxide, which is used when manufacturing calcium stearate), or as soil amendments in the agricultural industry.

Calcium hydroxide-based and/or magnesium hydroxide-based products appear in various forms. The person skilled in the art categorizes them as:
  powders: these are dry products in a powdered form;
  plastic putties, which have a high thixotropy;
  slurries or aqueous dispersions.

When they are ultimately used, particularly as a waste treatment agent, these calcium hydroxide-based and/or magnesium hydroxide-based products are used:
  either by directly adding the aqueous dispersion, putty, or powder containing them into the liquid waste to be treated;
  or indirectly, by way of a step of dispersing the powder in water, or by way of a step of diluting the putty, with a view to obtaining an aqueous dispersion which is added into the waste to be treated.

Thus, the person skilled in the art has sought for years to facilitate the dispersion of calcium and/or magnesium hydroxide in water, either to facilitate the direct use of the powder, putty, or dispersion of these hydroxides in the waste to be treated, or to facilitate the prior step of dispersing the powder or putty of calcium and/or magnesium hydroxide, the aqueous dispersion thereby obtained being then added into the waste to be treated. More generally speaking, the person skilled in the art seeks to improve the dispersibility of the metallic hydroxides in water, when he is seeking to manufacture aqueous dispersions of such hydroxides.

To that end, he is aware of several documents, based on the use of particular agents known as "dispersing agents", which possess the ability to improve the dispersion status of metallic hydroxides in water, and particularly calcium and/or magnesium hydroxides.

In concrete terms, when these agents are added to an aqueous suspension with a given percentage by dry weight of calcium and/or magnesium hydroxide, they lead to a viscosity less than that of an otherwise identical suspension (with the same level of calcium and/or magnesium hydroxide content by dry weight) which does not contain said dispersing agent. The benefit of exhibiting such a lower viscosity for a given solids content particularly lies with the ability to have access to aqueous dispersions which are fluid enough to be transported, and in particular, pumped.

Thus, in the field of calcium hydroxide dispersing agents, the person skilled in the art is familiar with the document EP 0,061,354 A1, which describes the use of (meth)acrylic acid homopolymers to manufacture aqueous dispersions of calcium hydroxide, with applications in water treatment.

He is also familiar with the document EP 0,313 483 A1, which describes a method for manufacturing an aqueous dispersion of calcium hydroxide by grinding said calcium hydroxide in water in the presence of a water-soluble polymer made up of at least one monocarboxylic ethylenic monomer whose molecular weight is between 200 g/mole and 1,900 g/mole, with the goal here being to combine the dispersion-in-water action with the action of reducing the size of the calcium hydroxide particles.

He is also familiar with the document FR 2,677,351, which describes an aqueous dispersion of calcium hydroxide whose solids content of calcium hydroxide is greater than 40% of its total weight, and whose rheological behavior is such that the dispersion obtained can be handled (and in particular, pumped) and is stable over time: this goal is met by using an alkaline or alkaline-earth metal polyacrylate as a dispersing agent.

He is also familiar with the document FR 2,687,396, which describes an aqueous dispersion of calcium hydroxide, whose solids content of calcium hydroxide is greater than 60% of its weight, and whose viscosity is less than 15 Pa·s: this goal is met by using a polyanion as a dispersing agent, said polyanion preferentially being derived from (meth)acrylic acid.

He is also familiar with the document EP 0,594,332 A1, which describes the use, as a lime dispersing agent, of acrylic acid homopolymer and copolymer sodium salts, in order to obtain aqueous dispersions of calcium oxide and calcium hydroxide containing at least 20% by dry weight of mineral materials, which can be handled and are stable over time. This document emphasizes the effectiveness of anionic polymers, made up particularly of more than 93% (meth)acrylic acid by weight, as dispersing agents for calcium hydroxide.

He is also familiar with the document WO 2006 050567, which describes the use of the combination of polycarboxylate dispersants and carbohydrate dispersants, in order to obtain aqueous dispersions of hydrated lime with a low viscosity. This document particularly emphasizes that polycarboxylate dispersing agents, when used alone, are already very good dispersing agents for hydrated lime. It also instructs that copolymers of acrylic acid with a polyoxyalkylene monomer are very good dispersing agents for calcium hydroxide.

Finally, he is also familiar with the document JP 09 122471, which describes the use of copolymers made of a carboxylic monomer and a polyaklyleneglycol (meth)acrylate monomer (such as methoxypolyethyleneglycol methacrylate) as a dispersing agent that makes it possible to obtain aqueous dispersions of calcium hydroxide exhibiting a low viscosity. This document illustrates the use of a copolymer (acrylic acid: methoxypolyethyleneglycol methacrylate with a molecular weight of 770 g/mole) for that purpose, in a mass ratio of 25:75, and whose molecular weight is less than 20,000 g/mole.

In the field of dispersing agents used to disperse magnesium hydroxide in water, the person skilled in the art is familiar with the document JP 59 049835, which describes the manufacturing of aqueous dispersions of $Mg(OH)_2$ using melamine-formaldehyde condensates containing a sulfonyl radical. This document instructs that up to 60% by dry weight of magnesium hydroxide may then be dispersed in water.

He is also familiar with the document JP 55 167125, which describes neutralized polymers of (meth)acrylic acid, enabling the manufacturing of aqueous dispersions of magnesium hydroxide with a solids content at least equal to 60% of their weight, while having a rheological profile compatible with transporting and handling such dispersions.

He is also familiar with the document JP 56 073623, which describes the dispersion in water of magnesium hydroxide, based on soluble phosphates and copolymers made up of 5% to 65% by molar weight of a hydroxyalkyl(meth)acrylate monomer and 40% to 95% by molar weight of another monomer based on carboxylic acid. In this manner, dispersions which are stable over time and have a low viscosity are manufactured.

However, all of the aforementioned documents rely on manufacturing aqueous dispersions of calcium hydroxide or magnesium hydroxide, through a full reaction between the initial oxide and the water used, using reactions which are well known to the person skilled in the art, and which, assuming stoichiometric balance, are written:

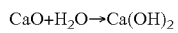

$$CaO+H_2O \rightarrow Ca(OH)_2$$

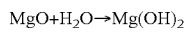

$$MgO+H_2O \rightarrow Mg(OH)_2$$

None of the aforementioned documents disclose or suggest the possibility of only partially carrying out the aforementioned reactions, in the presence of a water-soluble vinylic polymer in an emulsion or aqueous solution. Likewise, the Applicant is aware of no documents that disclose or suggest the possibility of only partially carrying out the reaction of hydrating a metallic oxide, in the presence of a water-soluble vinylic polymer in an emulsion or aqueous solution, with a view to obtaining the corresponding metallic hydroxide.

Figure 1:
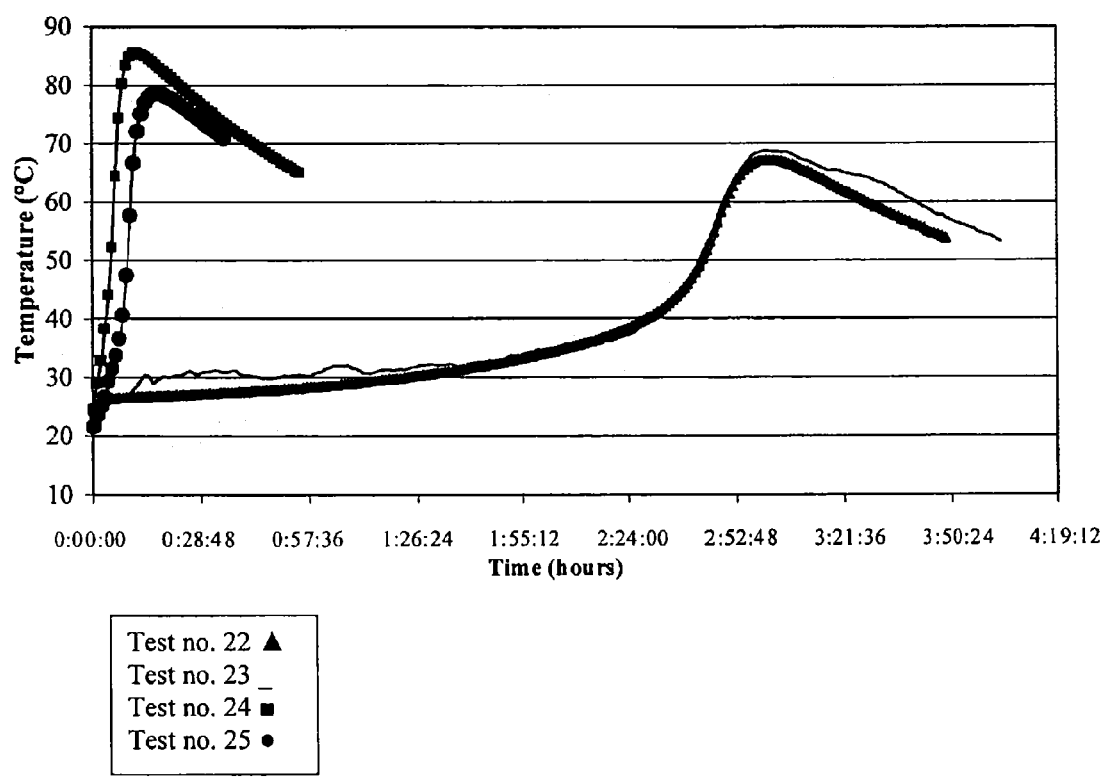
FIG. 1 is a graph showing the temperature of the reactive environment over time.

Continuing her research with a view to improving the dispersibility of metallic hydroxides in water, the Applicant has engineered a new method for manufacturing a metallic hydroxide-based and metallic oxide-based powder, characterized:
  1) in that it comprises the steps of:
    a) providing at least one metallic oxide in the form of a dry powder,
    b) treating said powder with a polymer in the form of an aqueous solution and/or emulsion, in such a way that the level of metallic hydroxide by dry weight within said treated powder is less than 99%, preferentially less than 75%, very preferentially less than 50%, and extremely preferentially less than 10% of its total weight,
  2) and in that said polymer is a water-soluble copolymer or homopolymer containing at least one vinylic monomer.

The fact that the metallic hydroxide content within the powder is not 100% of said powder's total weight indicates that not all of the initial oxide was converted into the corresponding metallic hydroxide.

The Applicant notes that the metals preferentially covered by the present invention are calcium, magnesium, copper, zinc, iron, and mixtures thereof, and very preferentially calcium, magnesium, and mixtures thereof.

Thus, the inventive method results in a product made up of metallic hydroxide and oxide, which is a powder treated by a water-soluble vinylic polymer in the form of an emulsion or aqueous solution. Due to the presence of oxides and hydroxides within this product, it will be referred to in the remainder of the Application as "mixed powder". Furthermore, the benefit of treatment using said polymer is making the mixed powder thereby formed self-dispersing in water: by adding this mixed powder into water, an aqueous dispersion of said powder is easily created, without adding any additional dispersing agent. Due to the self-dispersing nature of this mixed powder, it will be referred to in the remainder of the Application as "self-dispersing mixed powder" with a view to denoting the product created by the inventive method. The Applicant notes that, though an additional dispersing agent is not necessary to obtain a powder in the form of a dispersion in water, it is not out of the question to add another dispersing agent after step b) of the inventive method.

Another benefit of the present invention is that the self-dispersing mixed powder as described above may be dispersed in water in such a way as to obtain dispersions whose solids content may be between 10% and 80% of their weight, while having a lower viscosity than an otherwise identical dispersion created without the polymer used during step b). The person skilled in the art thereby has the ability to manufacture aqueous dispersions of metallic hydroxide whose solids content can be regulated, while keeping the viscosity at a low enough level for said dispersions to remain transportable, and in particular, pumpable.

Additionally, this self-dispersing nature is achieved once treated by said water-soluble vinylic polymer, and remains over time. This means that the self-dispersing mixed powder resulting from the inventive method may be preserved (i.e. particularly easy to store in bags), or transported as-is (i.e. in powdered form, which represents an increase in the mineral material content transported compared to an aqueous suspension or a slurry), said powder maintaining its nature of being self-dispersing in water: several days after treatment by said water-soluble vinylic polymer, said powder may then be easily dispersed in water, without later adding a dispersing agent. As indicated above, the person skilled in the art may nevertheless choose to add another dispersing agent afterward (i.e. after step b) of the inventive method).

In the particular situation of calcium and/or magnesium hydroxide which are used to treat waste, the person skilled in the art is thus provided with the ability:
  to treat the waste by directly adding an inventive self-dispersing mixed powder, which will easily disperse in the aqueous phase of the waste to be treated;
  or to treat the waste by adding an aqueous dispersion of calcium and/or magnesium hydroxide, which results from dispersing the inventive self-dispersing mixed powder.

Additionally, and completely surprisingly for calcium and magnesium, the inventive self-dispersing mixed powders result in aqueous dispersions which exhibit a neutralizing effectiveness greater than that of an aqueous dispersion according to the prior art: in order to fully neutralize the acidic waste, the active mass of the aqueous dispersion obtained from an inventive powder is less than that of an aqueous dispersion obtained according to the prior art.

Finally, in a preferential embodiment of the invention, which only applies to calcium and/or magnesium, said water-soluble vinylic polymer used during step b) is a water-soluble copolymer containing at least one vinylic monomer and at least one non-ionic monomer having formula (I) or mixtures of several monomers having formula (I):

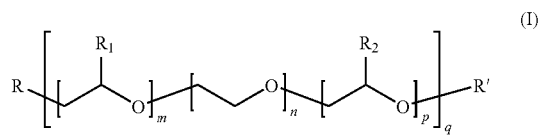

where:
- m and p represent a number of alkylene oxide units less than or equal to 150,
- n represents a number of ethylene oxide units less than or equal to 150,
- q represents an integer at least equal to 1 and such that $5 \leq (m+n+p)_q \leq 150$, and preferentially such that $15 \leq (m+n+p)q \leq 120$,
- $R_1$ represents hydrogen or the methyl or ethyl radical,
- $R_2$ represents hydrogen or the methyl or ethyl radical,
- R represents a radical containing a polymerizable unsaturated function, preferentially belonging to the group of vinylics as well as the group of acrylic, methacrylic, and maleic esters, as well as to the group of unsaturated urethanes such as acrylurethane, methacrylurethane, $\alpha$-$\alpha'$ dimethyl-isopropenyl-benzylurethane, allylurethane, as well as to the group of allylic or vinylic ethers, whether substituted or not, or to the group of ethylenically unsaturated amides or imides, or to the group made up of acrylamide and methacrylamide,
- R' represents hydrogen or a hydrocarbonated radical having 1 to 40 carbon atoms, preferentially 1 to 12 carbon atoms, and very preferentially 1 to 4 carbon atoms, R' extremely preferentially being the methyl radical, Entirely surprisingly, when such copolymers are used during step b) of the inventive method, the self-dispersing mixed powder thereby obtained has no hydration delay compared to the same powder obtained using polymers which do not correspond to the preferential variant of the invention during step b). This hydration delay is a phenomenon which is well-known to the person skilled in the art, which reflects the kinetics of the hydration reaction between the calcium and/or magnesium oxide and water. Such a reaction is exothermic: the time for which the temperature of the reactive environment is at its maximum corresponds to the hydration delay of the hydroxide in question. The lower this delay is, the faster the reaction is, and the more quickly the calcium and/or magnesium hydroxide becomes dispersed in water.

By increasing this hydration speed in connection with the preferential variant of the invention, the placement of the powder into an aqueous dispersion is accelerated. The result is therefore a powder which is:

mixed (based on calcium and/or magnesium hydroxide and oxide), self-dispersing in water (it is not necessary to add a dispersing agent later on in order to place the powder into an aqueous dispersion), and whose hydration speed is increased, which gives it a particularly improved quality of being self-dispersing in water: the hydration speed of this powder is increased compared to the same powder treated with a polymer that does not belong to the preferential variant of the invention.

One of the Applicant's merits therefore resides in the fact that she has been able to engineer a method for manufacturing a powder, which differs from all methods of the prior art based on directly manufacturing aqueous dispersions, in that it implements a step of manufacturing a product which is a powder that is:

mixed, made up of metallic oxides and hydroxides, treated using a water-soluble vinylic polymer in the form of an emulsion and/or aqueous solution, which makes it self-dispersing in water, whose neutralizing effectiveness is improved when the powder is dispersed in water, compared to the neutralizing power of aqueous dispersions of the prior art, for situations of calcium and magnesium.

Another one of her merits resides in the research which he is carried out for the purpose of identifying a particular family of water-soluble vinylic copolymers containing at least one other non-ionic monomer having formula (I), and which, used preferentially during step b) of the method, make it possible to increase the hydration speed of the calcium and/or magnesium hydroxide: the result is that the self-dispersing mixed powder which is the object of the invention disperses into an aqueous dispersion more quickly.

Thus, a first object of the present invention is a method for manufacturing a powder containing at least a metallic hydroxide and oxide, characterized:

1) in that it comprises the steps of:
   a) providing at least one metallic oxide in the form of a dry powder,
   b) treating said powder with a polymer in the form of an aqueous solution and/or emulsion, in such a way that the level of metallic hydroxide by dry weight within said treated powder is less than 99%, preferentially less than 75%, very preferentially less than 50%, and extremely preferentially less than 10% of its total weight, 2) and in that said polymer is a water-soluble copolymer or homopolymer containing at least one vinylic monomer.

The Applicant notes that in the foreword given above, it must be understood that there is at least one oxide and one hydroxide of the same metal.

The inventive method is further characterized in that the metallic oxide is preferentially chosen from among calcium, magnesium, copper, zinc, and iron oxides and mixtures thereof, and very preferentially from calcium, magnesium, and mixtures thereof.

The inventive method is further characterized in that the water-soluble vinylic polymer used during step b) is a water-soluble polymer containing at least one vinylic monomer chosen from among (meth)acrylic acid, or from among (meth)acrylic esters, preferentially including acrylates and methacrylates having 1 to 20 carbon atoms in their ester radical, very preferentially including methyl, ethyl, isopropyl, n-propyl, isobutyl, n-butyl, ter-butyl, and 2-ethylhexyl acrylates, methyl and ethyl methacrylates, hydroxylated methacrylates such as hydroxyethyl and hydroxypropyl methacrylates, or from among (meth)acrylamides, or from among aromatic vinylic monomers preferentially including styrene, α-methylstyrene, or from among (meth)acrylic esters of cationic monomers, preferentially including [2-(methacryloyloxy)ethyl] trimethyl ammonium sulfate or chloride, [2-(acryloyloxy)ethyl] trimethyl ammonium sulfate or chloride, [3-(acrylamido)propyl] trimethyl ammonium sulfate or chloride, dimethyl diallyl ammonium sulfate or chloride, [3-(methacrylamido)propyl] trimethyl ammonium sulfate or chloride, or from among mixtures of such monomers, and preferentially in that the vinylic monomer is acrylic acid or methacrylic acid or mixtures of such monomers.

In one preferential variant, the inventive method is characterized in that the metallic oxide is a magnesium and/or calcium oxide, and in that the water-soluble vinylic polymer used during step b) is a water-soluble vinylic copolymer made up of:

at least one vinylic monomer chosen from among (meth) acrylic acid, or from among (meth)acrylic esters, preferentially including acrylates and methacrylates having 1 to 20 carbon atoms in their ester radical, very preferentially including methyl, ethyl, isopropyl, n-propyl, isobutyl, n-butyl, ter-butyl, and 2-ethylhexyl acrylates, methyl and ethyl methacrylates, hydroxylated methacrylates such as hydroxyethyl and hydroxypropyl methacrylates, or from among (meth)acrylamides, or from among aromatic vinylic monomers preferentially including styrene, α-methylstyrene, or from among (meth)acrylic esters of cationic monomers, preferentially including [2-(methacryloyloxy)ethyl] trimethyl ammonium sulfate or chloride, [2-(acryloyloxy)ethyl] trimethyl ammonium sulfate or chloride, [3-(acrylamido)propyl] trimethyl ammonium sulfate or chloride, dimethyl diallyl ammonium sulfate or chloride, [3-(methacrylamido)propyl] trimethyl ammonium sulfate or chloride, or from among mixtures of such monomers, and preferentially in that the vinylic monomer is acrylic acid or methacrylic acid or mixtures of such monomers, and at least one non-ionic monomer having formula (I), or mixtures of multiple monomers having formula (I):

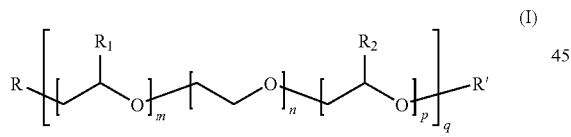

(I)

where:
m and p represent a number of alkylene oxide units less than or equal to 150,
n represents a number of ethylene oxide units less than or equal to 150,
q represents an integer at least equal to 1 and such that $5 \leq (m+n+p)q \leq 150$, and preferentially such that $15 \leq (m+n+p)q \leq 120$,
$R_1$ represents hydrogen or the methyl or ethyl radical,
$R_2$ represents hydrogen or the methyl or ethyl radical,
R represents a radical containing a polymerizable unsaturated function, preferentially belonging to the group of vinylics as well as the group of acrylic, methacrylic, and maleic esters, as well as to the group of unsaturated urethanes such as acrylurethane, methacrylurethane, α-α' dimethyl-isopropenyl-benzylurethane, allylurethane, as well as to the group of allylic or vinylic ethers, whether substituted or not, or to the group of ethylenically unsaturated amides or imides, or to the group made up of acrylamide and methacrylamide,
R' represents hydrogen or a hydrocarbonated radical having 1 to 40 carbon atoms, preferentially 1 to 12 carbon atoms, and very preferentially 1 to 4 carbon atoms, R' being extremely preferentially the methyl radical.

According to this preferential variant, the inventive method is further characterized in that said water-soluble vinylic copolymer used during step b) is made up, expressed as a percentage by weight of each of the components (with the sum of the percentages by weight of all the components being equal to 100%) of:

1% to 20%, preferentially 2% to 15%, and very preferentially 3% to 12% of at least one vinylic monomer chosen from among (meth)acrylic acid, or from among (meth)acrylic esters, preferentially including acrylates and methacrylates having 1 to 20 carbon atoms in their ester radical, very preferentially including methyl, ethyl, isopropyl, n-propyl, isobutyl, n-butyl, ter-butyl, and 2-ethylhexyl acrylates, methyl and ethyl methacrylates, hydroxylated methacrylates such as hydroxyethyl and hydroxypropyl methacrylates, or from among (meth)acrylamides, or from among aromatic vinylic monomers preferentially including styrene, α-methylstyrene, or from among (meth)acrylic esters of cationic monomers, preferentially including [2-(methacryloyloxy)ethyl] trimethyl ammonium sulfate or chloride, [2-(acryloyloxy)ethyl] trimethyl ammonium sulfate or chloride, [3-(acrylamido)propyl] trimethyl ammonium sulfate or chloride, dimethyl diallyl ammonium sulfate or chloride, [3-(methacrylamido)propyl] trimethyl ammonium sulfate or chloride, or from among mixtures of such monomers, and preferentially in that the vinylic monomer is acrylic acid or methacrylic acid or mixtures of such monomers, 80% to 99%, preferentially 85% to 90%, and very preferentially 80% to 97% of at least one non-ionic monomer having formula (I), or mixtures of multiple monomers having formula (I):

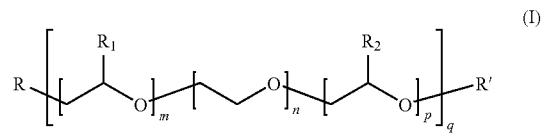

(I)

where:
m and p represent a number of alkylene oxide units less than or equal to 150,
n represents a number of ethylene oxide units less than or equal to 150,
q represents an integer at least equal to 1 and such that $5 \leq (m+n+p)q \leq 150$, and preferentially such that $15 \leq (m+n+p)q \leq 120$,
$R_1$ represents hydrogen or the methyl or ethyl radical,
$R_2$ represents hydrogen or the methyl or ethyl radical,
R represents a radical containing a polymerizable unsaturated function, preferentially belonging to the group of vinylics as well as the group of acrylic, methacrylic, and maleic esters, as well as to the group of unsaturated urethanes such as acrylurethane, methacrylurethane, α-α' dimethyl-isopropenyl-benzylurethane, allylurethane, as well as to the group of allylic or vinylic ethers, whether substituted or not, or to the group of ethylenically unsaturated amides or imides, or to the group made up of acrylamide and methacrylamide, R' represents hydrogen or a hydrocarbonated radical having 1 to 40 carbon atoms, preferentially 1 to 12 carbon atoms, and very preferentially 1 to 4 carbon atoms, R' being extremely preferentially the methyl radical.

Generally speaking, the inventive method is further characterized in that the water-soluble vinylic polymer used during step b) is totally or partially neutralized by at least one neutralization agent, chosen from among calcium, magnesium, barium, or lithium hydroxides and/or oxides, or from among sodium, potassium, or ammonium hydroxides, or from among primary, secondary, and tertiary amines, and mixtures thereof.

Generally speaking, the inventive method is further characterized in that the water-soluble vinylic polymer used during step b) is obtained by a method of radical polymerization in a solution, in a direct or reverse emulsion, in a suspension or precipitation in solvents, in the presence of catalytic systems and transfer agents, or by controlled radical polymerization methods, and preferentially by nitroxide-mediated polymerization (NMP) or cobaloxime-mediated polymerization, atom transfer radical polymerization (ATRP), sulfur derivative-mediated radical polymerization, said derivatives being chosen from among carbamates, dithioesters or trithiocarbonates (RAFT) or xanthates.

Generally speaking, the inventive method is further characterized in that the water-soluble vinylic polymer used during step b) may potentially, before or after the full or partial neutralization reaction, be treated and separated into multiple phases, using static or dynamic processes which are well known to the person skilled in the art, by one or more polar solvents preferentially belonging to the group made up of water, methanol, ethanol, propanol, isoproterenol, butanols, acetone, tetrahydrofuran, or mixtures thereof. In such a case, one of the phases corresponds to the polymer used according to the invention.

Generally speaking, the inventive method is further characterized in that it uses a thickening agent during and/or after step b) of said method.

A further object of the invention resides in the powders containing at least one metallic hydroxide and oxide, characterized:
1) in that their level of metallic hydroxide by dry weight is less than 99%, preferentially less than 75%, very preferentially less than 50%, and extremely preferentially less than 10% of their total weight,
2) and in that they contain a polymer which is a homopolymer or water-soluble copolymer containing at least one vinylic monomer.

The Applicant notes that in the foreword given above, it must be understood that there is at least one oxide and one hydroxide of the same metal.

These powders are further characterized in that the metallic oxide is preferentially chosen from among calcium, magnesium, copper, zinc, and iron oxides and mixtures thereof, and very preferentially from calcium and magnesium oxides and mixtures thereof.

These powders are further characterized in that the water-soluble vinylic polymer used during step b) is a water-soluble polymer containing at least one vinylic monomer chosen from among (meth)acrylic acid, or from among (meth)acrylic esters, preferentially including acrylates and methacrylates having 1 to 20 carbon atoms in their ester radical, very preferentially including methyl, ethyl, isopropyl, n-propyl, isobutyl, n-butyl, ter-butyl, and 2-ethylhexyl acrylates, methyl and ethyl methacrylates, hydroxylated methacrylates such as hydroxyethyl and hydroxypropyl methacrylates, or from among (meth)acrylamides, or from among aromatic vinylic monomers preferentially including styrene, α-methylstyrene, or from among (meth)acrylic esters of cationic monomers, preferentially including [2-(methacryloyloxy)ethyl] trimethyl ammonium sulfate or chloride, [2-(acryloyloxy)ethyl] trimethyl ammonium sulfate or chloride, [3-(acrylamido)propyl] trimethyl ammonium sulfate or chloride, dimethyl diallyl ammonium sulfate or chloride, [3-(methacrylamido)propyl] trimethyl ammonium sulfate or chloride, or from among mixtures of such monomers, and preferentially in that the vinylic monomer is acrylic acid or methacrylic acid or mixtures of such monomers.

In one preferential variant, the inventive powders are characterized in that the metallic oxide is a magnesium and/or calcium oxide, and in that the water-soluble vinylic polymer is a water-soluble vinylic copolymer made up of:

at least one vinylic monomer chosen from among (meth)acrylic acid, or from among (meth)acrylic esters, preferentially including acrylates and methacrylates having 1 to 20 carbon atoms in their ester radical, very preferentially including methyl, ethyl, isopropyl, n-propyl, isobutyl, n-butyl, ter-butyl, and 2-ethylhexyl acrylates, methyl and ethyl methacrylates, hydroxylated methacrylates such as hydroxyethyl and hydroxypropyl methacrylates, or from among (meth)acrylamides, or from among aromatic vinylic monomers preferentially including styrene, α-methylstyrene, or from among (meth)acrylic esters of cationic monomers, preferentially including [2-(methacryloyloxy)ethyl] trimethyl ammonium sulfate or chloride, [2-(acryloyloxy)ethyl] trimethyl ammonium sulfate or chloride, [3-(acrylamido)propyl] trimethyl ammonium sulfate or chloride, dimethyl diallyl ammonium sulfate or chloride, [3-(methacrylamido)propyl] trimethyl ammonium sulfate or chloride, or from among mixtures of such monomers, and preferentially in that the vinylic monomer is acrylic acid or methacrylic acid or mixtures of such monomers, and at least one non-ionic monomer having formula (I), or mixtures of multiple monomers having formula (I):

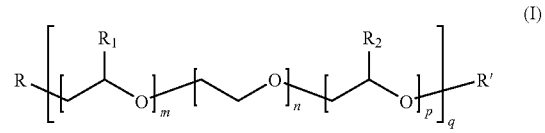

where:
m and p represent a number of alkylene oxide units less than or equal to 150,
n represents a number of ethylene oxide units less than or equal to 150,
q represents an integer at least equal to 1 and such that $5 \leq (m+n+p)q \leq 150$, and preferentially such that $15 \leq (m+n+p)q \leq 120$,
$R_1$ represents hydrogen or the methyl or ethyl radical,
$R_2$ represents hydrogen or the methyl or ethyl radical,
R represents a radical containing a polymerizable unsaturated function, preferentially belonging to the group of vinylics as well as the group of acrylic, methacrylic, and maleic esters, as well as to the group of unsaturated urethanes such as acrylurethane, methacrylurethane, α-α' dimethyl-isopropenyl-benzylurethane, allylurethane, as well as to the group of allylic or vinylic ethers, whether substituted or not, or to the group of ethylenically unsaturated amides or imides, or to the group made up of acrylamide and methacrylamide, R' represents hydrogen or a hydrocarbonated radical having 1 to 40 carbon atoms, preferentially 1 to 12 carbon atoms, and very preferentially 1 to 4 carbon atoms, R' being extremely preferentially the methyl radical.

According to this preferential variant, the inventive method is further characterized in that said water-soluble vinylic copolymer is made up, expressed as a percentage by weight of each of the components (with the sum of the percentages by weight of all the components being equal to 100%), of:

1% to 20%, preferentially 2% to 15%, and very preferentially 3% to 12% of at least one vinylic monomer chosen from among (meth)acrylic acid, or from among (meth) acrylic esters, preferentially including acrylates and methacrylates having 1 to 20 carbon atoms in their ester radical, very preferentially including methyl, ethyl, isopropyl, n-propyl, isobutyl, n-butyl, ter-butyl, and 2-ethylhexyl acrylates, methyl and ethyl methacrylates, hydroxylated methacrylates such as hydroxyethyl and hydroxypropyl methacrylates, or from among (meth) acrylamides, or from among aromatic vinylic monomers preferentially including styrene, α-methylstyrene, or from among (meth)acrylic esters of cationic monomers, preferentially including [2-(methacryloyloxy)ethyl] trimethyl ammonium sulfate or chloride, [2-(acryloyloxy) ethyl] trimethyl ammonium sulfate or chloride, [3-(acrylamido)propyl] trimethyl ammonium sulfate or chloride, dimethyl diallyl ammonium sulfate or chloride, [3-(methacrylamido)propyl] trimethyl ammonium sulfate or chloride, or from among mixtures of such monomers, and preferentially in that the vinylic monomer is acrylic acid or methacrylic acid or mixtures of such monomers, 80% to 99%, preferentially 85% to 90%, and very preferentially 80% to 97% of at least one non-ionic monomer having formula (I), or mixtures of multiple monomers having formula (I):

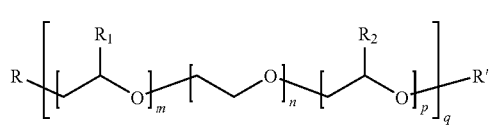

where:
m and p represent a number of alkylene oxide units less than or equal to 150,
n represents a number of ethylene oxide units less than or equal to 150,
q represents an integer at least equal to 1 and such that $5 \leq (m+n+p)q \leq 150$, and preferentially such that $15 \leq (m+n+p)q \leq 120$,
$R_1$ represents hydrogen or the methyl or ethyl radical,
$R_2$ represents hydrogen or the methyl or ethyl radical,
R represents a radical containing a polymerizable unsaturated function, preferentially belonging to the group of vinylics as well as the group of acrylic, methacrylic, and maleic esters, as well as to the group of unsaturated urethanes such as acrylurethane, methacrylurethane, α-α' dimethyl-isopropenyl-benzylurethane, allylurethane, as well as to the group of allylic or vinylic ethers, whether substituted or not, or to the group of ethylenically unsaturated amides or imides, or to the group made up of acrylamide and methacrylamide, R' represents hydrogen or a hydrocarbonated radical having 1 to 40 carbon atoms, preferentially 1 to 12 carbon atoms, and very preferentially 1 to 4 carbon atoms, R' being extremely preferentially the methyl radical.

Generally speaking, the inventive powders are further characterized in that the water-soluble vinylic polymer used during step b) is totally or partially neutralized by at least one neutralization agent, chosen from among calcium, magnesium, barium, or lithium hydroxides and/or oxides, or from among sodium, potassium, or ammonium hydroxides, or from among primary, secondary, and tertiary amines, and mixtures thereof.

Generally speaking, the inventive powders are further characterized in that the water-soluble vinylic polymer used during step b) is obtained by a method of radical polymerization in a solution, in a direct or reverse emulsion, in a suspension or precipitation in solvents, in the presence of catalytic systems and transfer agents, or by controlled radical polymerization methods, and preferentially by nitroxide-mediated polymerization (NMP) or cobaloxime-mediated polymerization, atom transfer radical polymerization (ATRP), sulfur derivative-mediated radical polymerization, said derivatives being chosen from among carbamates, dithioesters or trithiocarbonates (RAFT) or xanthates.

Generally speaking, the inventive powders are further characterized in that the water-soluble vinylic polymer used during step b) may potentially, before or after the full or partial neutralization reaction, be treated and separated into multiple phases, using static or dynamic processes which are well known to the person skilled in the art, by one or more polar solvents preferentially belonging to the group made up of water, methanol, ethanol, propanol, isoproterenol, butanols, acetone, tetrahydrofuran, or mixtures thereof.

A further object of the invention resides in the use of the inventive powders in order to manufacture an aqueous dispersion of at least one metallic hydroxide, preferentially chosen from among calcium, magnesium, copper, zinc, and iron hydroxides and mixtures thereof, and very preferentially from calcium and magnesium hydroxides and mixtures thereof.

A further object of the invention resides in the aqueous dispersions of at least one metallic hydroxide, preferentially chosen from among calcium, magnesium, copper, zinc, and iron hydroxides and mixtures thereof, and very preferentially from calcium and magnesium hydroxides and mixtures thereof.

A further object of the invention resides in the use of powders containing at least one metallic hydroxide and one oxide, and aqueous dispersions of at least one metallic hydroxide according to the invention, in order to treat household or industrial waste, and particularly gaseous waste such as acidic fumes.

A further object of the invention resides in the use of powders containing at least one metallic hydroxide and one oxide and aqueous dispersions of at least one metallic hydroxide according to the invention, as a chemical reagent.

A further object of the invention resides in the use of powders and aqueous aspersions of at least one metallic hydroxide according to the invention, as a soil amendment.

The following examples illustrate the invention, though without limiting its scope.

EXAMPLES

In all examples, the molecular weight of the polymers used is determined based on the method explained below, using Size Exclusion Chromatography (SEC).

A test tube of the polymer solution corresponding to 90 mg of dry matter is added into a 10 mL flask.

The mobile phase is added, along with 0.04% THF, up to a total mass of 10 g.

The composition of this mobile phase is as follows: $NaNO_3$: 0.2 mol/L, $CH_3COOH$: 0.5 mol/L, acetonitrile 5% by volume.

The SEC chain consists of a Waters™ 510 isocratic pump, the flow of which is set to 0.8 mL/min, a Waters 717+ autosampler, an oven containing a "Guard Column Ultrahydrogel Waters™" precolumn, followed by an "Ultrahydrogel Waters™" set of columns with a 7.8 mm internal diameter and 30 cm in length, for which the nominal porosities are, in order of connection: 2000, 1000, 500, and 250 Å.

Detection is ensured by a Waters™ 410 type differential refractometer.

The temperature of the oven and the detector is set at 35° C.

The chromatogram is acquired and processed using the software PSS WinGPC Scientific v 4.02.

The SEC is calibrated by a series of sodium polyacrylate standards provided by Polymer Standard Service with the references PAA 18 K, PAA 8K, PAA 5K, PAA 4K, PAA 3K. The calibration curve is linear and takes into account the correction obtained using the flow marker (THF).

Example 1

This example illustrates the inventive method for manufacturing a self-dispersing mixed powder of calcium hydroxide and oxide.

This example further illustrates the inventive self-dispersing mixed powders of calcium hydroxide and oxide.

This example further illustrates the use of these powders when they are placed into an aqueous dispersion in water.

Finally, this example illustrates the inventive aqueous dispersions obtained by adding said powders into water.

Test No. 1

This test is a control, corresponding to the manufacturing of an aqueous dispersion of $Ca(OH)_2$, using methods well known to the person skilled in the art, in order to achieve a $Ca(OH)_2$ level equal to 50% of said dispersion's total weight.

Tests Nos. 2 to 5.

These tests illustrate the invention.

Each event begins by weighing out 400 grams of CaO in the form of a dry powder, according to step a) of the inventive method.

12 grams of a solution containing 20% by dry weight of a water-soluble vinylic polymer, compared with its total weight, is sprayed onto this calcium oxide, in accordance with step b) of the inventive method.

Under these circumstances, the level of calcium hydroxide by dry weight is equal to 9.6% of the treated powder's total weight.

Test No. 2

This test illustrates the invention, though without representing its preferential variant. It uses a water-soluble vinylic homopolymer, which is a water-soluble homopolymer of acrylic acid, fully neutralized by sodium hydroxide, and with a molecular weight equal to 3500 g/mole.

Test No. 3

This test illustrates the invention, though without representing its preferential variant. It uses a water-soluble vinylic polymer, which is a water-soluble vinylic copolymer made up, expressed as a percentage by weight of each of its components, of:

82.6% acrylic acid by weight, 17.4% methyl methacrylate by weight, fully neutralized by sodium hydroxide, and with a molecular weight equal to 2000 g/mole.

Test No. 4

This test illustrates the invention, as well as its preferential variant. It uses a water-soluble vinylic polymer, which is a water-soluble vinylic copolymer made up, expressed as a percentage by weight of each of its components, of:

9.7% acrylic acid by weight and 1.55% methyl methacrylate by weight, 88.75% methoxypolyethylene glycol methacrylate by weight, with a molecular weight equal to 5000 g/mole, fully neutralized by sodium hydroxide, and with a molecular weight equal to 52,000 g/mole.

Test No. 5

This test illustrates the invention, as well as its preferential variant. It uses a water-soluble vinylic polymer, which is a water-soluble vinylic copolymer made up, expressed as a percentage by weight of each of its components, of:

5.8% acrylic acid by weight and 1.65% methyl methacrylate by weight, 92.55% methoxypolyethylene glycol methacrylate by weight, with a molecular weight equal to 5,000 g/mole, fully neutralized by sodium hydroxide, and with a molecular weight equal to 64,400 g/mole.

Each powder obtained in tests nos. 2 to 5 is then added to water immediately after being manufactured, so as to create an aqueous dispersion whose calcium hydroxide level by dry weight is equal to 50% of its total weight.

This same powder was also used to manufacture aqueous dispersions with the same calcium hydroxide level by dry weight, but after having stored said powder at 25° C. for 14 days: these are tests nos. 6 to 9, which respectively use the same polymers as for tests nos. 2 to 5.

Likewise, after having stored this powder, but for 28 days, aqueous dispersions were manufactured with the same calcium hydroxide level by dry weight: these are tests nos. 10 to 13, which respectively use the same polymers as for tests nos. 2 to 5.

Next, using methods well known to the person skilled in the art, the Brookfield™ viscosities of the dispersions obtained are measured at 25° C. at 1, 10, and 100 revolutions per minute, respectively denoted $\mu_1$, $\mu_{10}$, and $\mu_{100}$, which are given in tables 1, 2, and 3.

TABLE 1

| | Test no. | | | | |
|---|---|---|---|---|---|
| | 1 | 2 | 3 | 4 | 5 |
| Reference/Invention | Reference | Invention | Invention | Invention | Invention |
| $\mu_1$ (Pa·s) | 30 | 20 | 30 | 8.8 | 10.2 |
| $\mu_{10}$ (Pa·s) | 4.8 | 4.7 | 4.6 | 3.6 | 4.0 |
| $\mu_{100}$ (Pa·s) | 2.9 | 2.5 | 2.1 | 1.4 | 1.4 |

TABLE 2

| | Test no. | | | | |
|---|---|---|---|---|---|
| | 1 | 6 | 7 | 8 | 9 |
| Reference/Invention | Reference | Invention | Invention | Invention | Invention |
| $\mu_1$ (Pa·s) | 30 | 21 | 28 | 9.5 | 11.2 |
| $\mu_{10}$ (Pa·s) | 4.8 | 4.7 | 4.7 | 3.8 | 4.1 |
| $\mu_{100}$ (Pa·s) | 2.9 | 2.4 | 2.2 | 1.4 | 1.5 |

TABLE 3

| | Test no. | | | | |
|---|---|---|---|---|---|
| | 1 | 10 | 11 | 12 | 13 |
| Reference/Invention | Reference | Invention | Invention | Invention | Invention |
| $\mu_1$ (Pa·s) | 30 | 21 | 29 | 9.1 | 11 |
| $\mu_{10}$ (Pa·s) | 4.8 | 4.7 | 4.6 | 3.8 | 4.1 |
| $\mu_{100}$ (Pa·s) | 2.9 | 2.5 | 2.2 | 1.4 | 1.5 |

Studying tables 1, 2, and 3 shows that using a polymer as described in tests nos. 2 to 5, in accordance with the invention, does indeed make the powder thereby obtained self-dispersing: aqueous dispersions of calcium hydroxide, with the same calcium hydroxide content by weight as the reference (50%) are indeed obtained, but their viscosities were lowered by using said polymer.

Additionally, tables 2 and 3 showed that the self-dispersing nature acquired by the powder when it is treated by the water-soluble vinylic polymer makes it possible to store the powder, and later use it to manufacture an aqueous dispersion: 14 days or even 28 days later, said powder is still self-dispersing in water, as attested to by the measured viscosity values.

Example 2

This example illustrates the inventive method for manufacturing a self-dispersible mixed powder of calcium hydroxide and oxide.

This example also illustrates the inventive self-dispersing mixed powder of calcium hydroxide and oxide.

This example also illustrates the use of this powder when it is placed into an aqueous dispersion.

Finally, this example illustrates the inventive aqueous dispersions obtained by adding said powders to water: Unlike the previous example, only an inventive polymer was used, but multiple aqueous dispersions with different levels of calcium hydroxide by dry weight were manufactured.

Tests nos. 14 to 17

These tests represent references, made up of an aqueous dispersion of $Ca(OH)_2$ and produced without a dispersing agent whose $Ca(OH)_2$ level by dry weight is equal to 30%, 35%, 40% and 45%, respectively, for tests nos. 14, 15, 16, and 17.

Next, using methods well known to the person skilled in the art, the Brookfield™ viscosities of the dispersions obtained are measured at 25° C. at 1, 10, and 100 revolutions per minute, respectively denoted $\mu_1$, $\mu_{10}$ and $\mu_{100}$. These are given in Table 4.

Tests nos. 18 to 21

These tests illustrate the invention.

Each event begins by weighing out 400 grams of CaO in the form of a dry powder, according to step a) of the inventive method.

12 grams of a solution containing 20% by dry weight of a water-soluble vinylic polymer, compared with its total weight, is sprayed onto this calcium oxide, in accordance with step b) of the inventive method.

This polymer is a water-soluble vinylic copolymer made up, expressed as a percentage by weight of each of its components, of:

9.7% acrylic acid by weight and 1.55% methyl methacrylate by weight, 88.75% methoxypolyethylene glycol methacrylate by weight, with a molecular weight equal to 5000 g/mole, fully neutralized by sodium hydroxide, and with a molecular weight equal to 52,000 g/mole.

Under these circumstances, the level of calcium hydroxide by dry weight is equal to 9.6% of the treated powder's total weight.

The powder thereby manufactured is then dispersed in water, so as to achieve a calcium hydroxide level, by weight, equal to 30%, 35%, 40%, and 45%, respectively, for tests nos. 18, 19, 20, and 21.

Next, using methods well known to the person skilled in the art, the Brookfield™ viscosities of the dispersions obtained are measured at 25° C. at 1, 10, and 100 revolutions per minute, respectively denoted $\mu_1$, $\mu_{10}$ and $\mu_{100}$. These are given in Table 4.

TABLE 4

| | Test no. | | | | | | | |
|---|---|---|---|---|---|---|---|---|
| | 14 | 18 | 15 | 19 | 16 | 20 | 17 | 21 |
| Solids content (% by weight of $Ca(OH)_2$) | 30 | 30 | 35 | 35 | 40 | 40 | 45 | 45 |
| $\mu_1$ (Pa·s) | 24 | 5 | 4.8 | 1.2 | 6.2 | 4.2 | 17 | 6.8 |
| $\mu_{10}$ (Pa·s) | 7.1 | 0.9 | 1.4 | 0.1 | 2.5 | 0.6 | 3.5 | 2.5 |
| $\mu_{100}$ (Pa·s) | 1.0 | 0.03 | 2.0 | 0.05 | 0.4 | 0.1 | 1.3 | 0.6 |

In table 4, comparing tests 14 and 18, 15 and 19, 16 and 20, 17 and 21 shows that using a water-soluble vinylic polymer according to the inventive method does indeed make the powder thereby obtained self-dispersing: aqueous dispersions of calcium hydroxide, with the same calcium hydroxide content by weight as the prior art, are indeed obtained, but their viscosities were lowered by using said polymer.

The Applicant notes that the person skilled in the art may use a thickening agent in order to optimize the stability of the dispersions obtained, should he so desire. Such a thickening agent may particularly be Thixol™ 53 L sold by the company COATEXT™.

Example 3

This example illustrates the inventive method for manufacturing a self-dispersible mixed powder of calcium hydroxide and oxide.

This example also illustrates the inventive self-dispersing mixed powder of calcium hydroxide and oxide.

This example also illustrates the use of this powder when it is placed into an aqueous dispersion in water.

The purpose of this example is to illustrate that, in the preferential variant of the invention, no hydration delay is observed when dispersing the manufactured powder in water.

Each of the tests nos. 22 to 25 begins by manufacturing a mixed powder of calcium hydroxide and oxide, using the same protocol as described in Example 1 for tests nos. 2 to 5.

The powder thereby manufactured is dispersed in water, so as to obtain an aqueous dispersion whose calcium hydroxide level by dry weight is equal to 37%.

Test No. 22

This test illustrates the invention, though without representing its preferential variant. It uses a water-soluble vinylic homopolymer, which is a water-soluble vinylic homopolymer of acrylic acid, fully neutralized by sodium hydroxide, and with a molecular weight equal to 3500 g/mole.

Test No. 23

This test illustrates the invention, though without representing its preferential variant. It uses a water-soluble vinylic polymer, which is a water-soluble vinylic copolymer made up, expressed as a percentage by weight of each of its components, of:

82.6% acrylic acid by weight,
17.4% methyl methacrylate by weight, fully neutralized by sodium hydroxide, and with a molecular weight equal to 2000 g/mole.

Test No. 24

This test illustrates the invention, as well as its preferential variant. It uses a water-soluble vinylic polymer, which is a water-soluble vinylic copolymer made up, expressed as a percentage by weight of each of its components, of:

5.8% acrylic acid by weight and 1.65% methyl methacrylate by weight,
92.55% methoxypolyethylene glycol methacrylate by weight, with a molecular weight equal to 5,000 g/mole, fully neutralized by sodium hydroxide, and with a molecular weight equal to 64,400 g/mole.

Test No. 25

This test illustrates the invention, as well as its preferential variant. It uses a water-soluble vinylic polymer, which is a water-soluble vinylic copolymer made up, expressed as a percentage by weight of each of its components, of:

9.7% acrylic acid by weight and 1.55% methyl methacrylate by weight,
88.75% methoxypolyethylene glycol methacrylate by weight, with a molecular weight equal to 5000 g/mole, fully neutralized by sodium hydroxide, and with a molecular weight equal to 52,000 g/mole.

Additionally, for each of the tests nos. 22 to 25, FIGS. 1/2 shows the change in the reactive environment's temperature over time.

Studying this figure shows that only the polymers corresponding to the preferential variant of the invention (according to tests nos. 24 and 25) do not cause a hydration delay. This example therefore shows that the polymers used in the preferential variant of the invention make it possible to achieve mixed powders of calcium hydroxide and oxide, which are self-dispersing in water, and whose hydration is immediate when such powders are dispersed in water.

Example 4

The purpose of this is amply is illustrate the use of an inventive aqueous dispersion of calcium hydroxide, obtained by dispersing an inventive powder in water, in an application for treating acidic waste.

This example particularly shows that the neutralizing power (as explained in the example) of such a dispersion is greater than the neutralizing power of an aqueous dispersion obtained according to the prior art.

This example begins with preparing a so-called "acidic waste" formulation by mixing and then homogenizing, within a 1 L beaker, 810.5 g of industrial water and 143 g of 100% sulfuric acid. The beaker of acidic waste is kept slightly agitated and is then equipped with a pH-measuring electrode, then placed on a scale.

Using a peristaltic pump, the aqueous dispersion to be tested according to the prior art or the invention, also known as a "neutralizing dispersion", is added to the acidic waste at a rate of 360 g per hour. The mass added to the beaker of waste, and the pH of the acidic waste, are measured at the same time until the pH reaches a value greater than seven, this value corresponding to the total neutralization of the acidity and the end of the test. The pump is then switched off.

Test No. 26

This test illustrates the prior art.

It uses an aqueous dispersion of calcium hydroxide according to the prior art, obtained as follows, as a neutralizing dispersion.

In a 1 L beaker, 460 g of industrial water is weighed out, then 200 g of calcium hydroxide ($Ca(OH)_2$) is added during moderate agitation. This formula, which is homogenous after five minutes of education, is kept its lead education in order to prevent any decanting that could harm the test.

Test No. 27

This test illustrates the invention.

It uses an aqueous dispersion of calcium hydroxide according to the invention, obtained as follows, as a neutralizing dispersion.

In a planetary mixer, 151.35 g of calcium oxide is weighed out. During moderate agitation, a solution is added by spraying, said solution being made up of 4.85 g of industrial water and 6.85 g of an emulsion, 33% of which by dry weight is a water-soluble vinylic copolymer made up, expressed as a percentage by weight of each of its components, of:

5.8% acrylic acid by weight and 1.65% methyl methacrylate by weight,
92.55% methoxypolyethylene glycol methacrylate by weight, with a molecular weight equal to 5,000 g/mole, fully neutralized by sodium hydroxide, and with a molecular weight equal to 64,400 g/mole.

After 15 minutes of agitation, the powder obtained is weighed out and a mass of 156.15 g is obtained: this results in a loss of 6.9 g of weight, which corresponds to the evaporated water that therefore did not take part in the pre-slaking of the calcium oxide.

This powder is then used to manufacture the neutralizing dispersion by adding the aforementioned mixture into 506.2 g of industrial water.

The preceding quantities were determined so that both of the neutralizing dispersions according to tests nos. 26 and 27 contain the same mass of lime, expressed in calcium hydroxide, i.e. 200 g dispersed in 460 g of industrial water.

Figure 2:
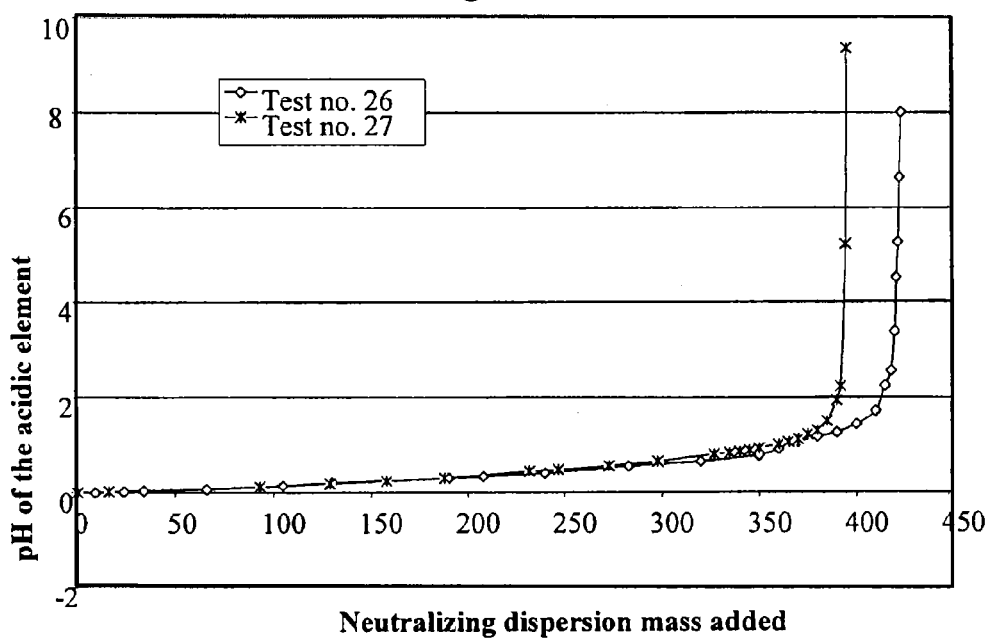
FIG. 2 is a graph showing the pH of the acidic waste as a function of the mass of neutralizing dispersion added.

FIGS. 2/2 shows the change in the pH of the acidic waste as a function of the mass of neutralizing dispersion added. The graphs corresponding to these two tests unequivocally show that the object of the invention makes it possible to achieve full neutralization of the acidic waste with a lower quantity of neutralizing dispersion, which results in a greater neutralizing effectiveness.

Example 5

This example illustrates the inventive method for manufacturing a self-dispersing mixed powder of magnesium hydroxide and oxide. It also illustrates the inventive self-dispersing mixed powders of magnesium hydroxide and oxide, their use when placed in an aqueous dispersion, and the aqueous dispersions obtained.

Test No. 28

This test is a control, corresponding to the manufacturing of an aqueous dispersion of Mg(OH)$_2$, using methods well known to the person skilled in the art, in order to achieve a Mg(OH)$_2$ level equal to 50% of said dispersion's total weight.

Tests Nos. 29 to 32

These tests illustrate the invention.

Each event begins by weighing out 400 grams of MgO in the form of a dry powder, according to step a) of the inventive method. 10 grams of a solution containing 20% by dry weight of a water-soluble vinylic polymer, compared with its total weight, is sprayed onto this magnesium oxide, in accordance with step b) of the inventive method. Under these circumstances, the level of magnesium hydroxide by dry weight is equal to 8% of the treated powder's total weight.

Test No. 29

This test illustrates the invention, though without representing its preferential variant. It uses a water-soluble vinylic homopolymer, which is a water-soluble homopolymer of acrylic acid, fully neutralized by sodium hydroxide, and with a molecular weight equal to 5000 g/mole.

Test No. 30

This test illustrates the invention, though without representing its preferential variant. It uses a water-soluble vinylic polymer, which is a water-soluble vinylic copolymer made up, expressed as a percentage by weight of each of its components, of:
  80.0% acrylic acid by weight,
  20.0% methyl methacrylate by weight,
fully neutralized by sodium hydroxide, and with a molecular weight equal to 2500 g/mole.

Test No. 31

This test illustrates the invention, as well as its preferential variant. It uses a water-soluble vinylic polymer, which is a water-soluble vinylic copolymer made up, expressed as a percentage by weight of each of its components, of:
  9.7% acrylic acid by weight and 1.55% methyl methacrylate by weight,
  88.75% methoxypolyethylene glycol methacrylate by weight, with a molecular weight equal to 5000 g/mole,
fully neutralized by sodium hydroxide, and with a molecular weight equal to 52,000 g/mole.

Test No. 32

This test illustrates the invention, as well as its preferential variant. It uses a water-soluble vinylic polymer, which is a water-soluble vinylic copolymer made up, expressed as a percentage by weight of each of its components, of:
  5.8% acrylic acid by weight and 1.65% methyl methacrylate by weight,
  92.55% methoxypolyethylene glycol methacrylate by weight, with a molecular weight equal to 5,000 g/mole,
fully neutralized by sodium hydroxide, and with a molecular weight equal to 64,400 g/mole.

Each powder obtained in tests nos. 29 to 32 is then added to water immediately after being manufactured, so as to create an aqueous dispersion whose magnesium hydroxide level by dry weight is equal to 50% of its total weight. This same powder is also used to manufacture aqueous dispersions with the same magnesium hydroxide level by dry weight, but after having stored said powder at 25° C. for 14 days: these are tests nos. 33 to 36, which respectively use the same polymers as for tests nos. 29 to 32.

Likewise, after having stored this powder, but for 28 days, aqueous dispersions were manufactured with the same magnesium hydroxide level by dry weight: these are tests nos. 37 to 40, which respectively use the same polymers as for tests nos. 29 to 32.

Next, using methods well known to the person skilled in the art, the Brookfield™ viscosities of the dispersions obtained are measured at 25° C. at 1, 10, and 100 revolutions per minute, respectively denoted $\mu_1$, $\mu_{10}$, and $\mu_{100}$, which are given in tables 5, 6, and 7.

TABLE 5

| | Test no. | | | | |
|---|---|---|---|---|---|
| | 28 | 29 | 30 | 31 | 32 |
| Reference/Invention | Reference | Invention | Invention | Invention | Invention |
| $\mu_1$ (Pa·s) | 35 | 21 | 31 | 10.5 | 11.2 |
| $\mu_{10}$ (Pa·s) | 6.2 | 4.9 | 5.3 | 4.6 | 4.9 |
| $\mu_{100}$ (Pa·s) | 3.2 | 2.8 | 2.4 | 2.0 | 2.4 |

TABLE 6

| | Test no. | | | | |
|---|---|---|---|---|---|
| | 28 | 33 | 34 | 35 | 36 |
| Reference/Invention | Reference | Invention | Invention | Invention | Invention |
| $\mu_1$ (Pa·s) | 35 | 21 | 31 | 10.5 | 11.2 |
| $\mu_{10}$ (Pa·s) | 6.2 | 4.9 | 5.7 | 4.8 | 4.9 |
| $\mu_{100}$ (Pa·s) | 3.2 | 2.7 | 2.6 | 2.0 | 2.5 |

TABLE 7

| | Test no. | | | | |
|---|---|---|---|---|---|
| | 28 | 37 | 38 | 39 | 40 |
| Reference/Invention | Reference | Invention | Invention | Invention | Invention |
| $\mu_1$ (Pa·s) | 35 | 21.5 | 32 | 11 | 11.8 |
| $\mu_{10}$ (Pa·s) | 6.2 | 5.0 | 5.8 | 4.8 | 4.9 |
| $\mu_{100}$ (Pa·s) | 3.2 | 2.8 | 2.8 | 2.0 | 2.5 |

Studying tables 5, 6, and 7 shows that use according to the inventive method does indeed make the powder thereby obtained self-dispersing: aqueous dispersions of calcium hydroxide, with the same calcium hydroxide content by weight as the reference are indeed obtained, but their viscosities were lowered by using said polymer.

Additionally, these tables show that the self-dispersing nature acquired by the powder when it is treated by the water-soluble vinylic polymer makes it possible to store the powder, and later use it to manufacture an aqueous dispersion: 14 days or even 28 days later, said powder is still self-dispersing in water, as attested to by the measured viscosity values.

Finally, these tables also illustrate the benefit of using the preferential variant of the invention, which results in lower viscosities.

The invention claimed is:

1. A method for manufacturing a powder comprising at least one metallic hydroxide and at least one metallic oxide, comprising:
    treating at least one metallic oxide in the form of a dry powder with at least one polymer in the form of an aqueous solution, an aqueous emulsion, or an aqueous solution and an aqueous emulsion so that said at least one metallic hydroxide formed thereby is present in an amount by dry weight within said treated powder of less than 99% of the total weight thereof, wherein said at least one polymer is a water-soluble copolymer or a homopolymer comprising at least one vinylic monomer unit.

2. The method according to claim 1, wherein said at least one metallic hydroxide is present in an amount by dry weight within said treated powder of less than 75% of the total weight thereof.

3. The method according to claim 1, wherein said at least one metallic hydroxide is present in an amount by dry weight within said treated powder of less than 50% of the total weight thereof.

4. The method according to claim 1, wherein said at least one metallic hydroxide is present in an amount by dry weight within said treated powder of less than 10% of the total weight thereof.

5. The method according to claim 1, wherein said at least one metallic oxide is selected from the group consisting of calcium oxide, magnesium oxide, copper oxide, zinc oxide, and iron oxide.

6. The method according to claim 1, wherein said at least one metallic oxide is selected from the group consisting of calcium oxide and magnesium oxide.

7. The method according to claim 1, wherein said at least one vinylic monomer unit is selected from the group consisting of a (meth)acrylic acid monomer unit, a (meth)acrylic ester monomer unit, a (meth)acrylamide monomer unit, an aromatic vinylic monomer unit, and a monomer unit of a (meth)acrylic ester of a cationic compound.

8. The method according to claim 7, wherein said (meth) acrylic ester monomer unit is selected from the group consisting of an acrylate monomer unit having 1 to 20 carbon atoms and a methacrylate monomer unit having 1 to 20 carbon atoms.

9. The method according to claim 7, wherein said (meth) acrylic ester monomer unit is selected from the group consisting of methyl acrylate, ethyl acrylate, isopropyl acrylate, n-propyl acrylate, isobutyl acrylate, n-butyl acrylate, ter-butyl acrylate, 2-ethylhexyl acrylate, methyl methacrylate, ethyl methacrylate, hydroxyethyl methacrylate, and hydroxypropyl methacrylate.

10. The method according to claim 7, wherein said aromatic vinylic monomer unit is selected from the group consisting of styrene and α-methystyrene.

11. The method according to claim 7, wherein said monomer unit of a (meth)acrylic ester of a cationic compound is selected from the group consisting of [2-(methacryloyloxy) ethyl] trimethyl ammonium sulfate, [2-(methacryloyloxy) ethyl] trimethyl ammonium chloride, [2-(acryloyloxy)ethyl] trimethyl ammonium sulfate, [2-(acryloyloxy)ethyl] trimethyl ammonium chloride, [3-(acrylamido)propyl] trimethyl ammonium sulfate, [3-(acrylamido)propyl] trimethyl ammonium chloride, dimethyl diallyl ammonium sulfate, dimethyl diallyl ammonium chloride, [3-(methacrylamido)propyl] trimethyl ammonium sulfate, and [3-(methacrylamido)propyl] trimethyl ammonium chloride.

12. The method according to claim 1, wherein the at least one vinylic monomer unit is at least one of an acrylic acid monomer unit and a methacrylic acid monomer unit.

13. The method according to claim 1, wherein
said at least one metallic oxide selected from the group consisting of calcium oxide and magnesium oxide; and
said at least one vinylic monomer unit is selected from the group consisting of a (meth)acrylic acid monomer unit, a (meth)acrylic ester monomer unit, a (meth)acrylamide monomer unit, an aromatic vinylic monomer unit, a monomer unit of a (meth)acrylic ester of a cationic compound, and a non-ionic monomer unit represented by formula (I)

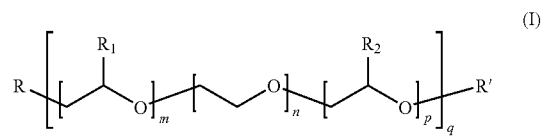

wherein
m, n and p each individually represent a number less than or equal to 150,
q represents an integer at least equal to 1 and such that $5 \leq (m+n+p)q < 150$,
$R_1$ and $R_2$ each independently represents hydrogen, a methyl radical, or an ethyl radical,
R represents a radical containing a polymerizable unsaturated functional group, and
R' represents hydrogen or a hydrocarbonated radical having 1 to 40 carbon atoms.

14. The method according to claim 13, wherein said (meth) acrylic ester monomer unit is selected from the group consisting of an acrylate monomer unit having 1 to 20 carbon atoms in the ester radical and a methacrylate monomer unit having 1 to 20 carbon atoms in the ester radical.

15. The method according to claim 13, wherein said (meth) acrylic ester monomer unit is selected from the group consisting of methyl acrylate, ethyl acrylate, isopropyl acrylate, n-propyl acrylate, isobutyl acrylate, n-butyl acrylate, ter-butyl acrylate, 2-ethylhexyl acrylate, methyl methacrylate, ethyl methacrylate, hydroxyethyl methacrylate, and hydroxypropyl methacrylate.

16. The method according to claim 13, wherein said aromatic vinylic monomer unit is selected from the group consisting of styrene and α-methystyrene.

17. The method according to claim 13, wherein said monomer unit of a (meth)acrylic ester of a cationic compound is selected from the group consisting of [2-(methacryloyloxy) ethyl] trimethyl ammonium sulfate, [2-(methacryloyloxy) ethyl] trimethyl ammonium chloride, [2-(acryloyloxy)ethyl] trimethyl ammonium sulfate, [2-(acryloyloxy)ethyl] trimethyl ammonium chloride, [3-(acrylamido)propyl] trimethyl ammonium sulfate, [3-(acrylamido)propyl] trimethyl ammonium chloride, dimethyl diallyl ammonium sulfate, dimethyl diallyl ammonium chloride, [3-(methacrylamido)propyl] trimethyl ammonium sulfate, and [3-(methacrylamido)propyl] trimethyl ammonium chloride.

18. The method according to claim 13, wherein the at least one vinylic monomer unit is at least one of an acrylic acid monomer unit and a methacrylic acid monomer unit.

19. The method according to claim 13, wherein q represents an integer at least equal to 1 and such that $15 \leq (m+n+p)q \leq 120$.

20. The method according to claim 13, wherein R is selected from the group consisting of a vinylic radical, an acrylic radical, a methacrylic radical, a maleic ester radical, an unsaturated urethane radical, an unsubstituted or substituted allylic ether radical, an unsubstituted or substituted vinylic ether radical, an ethylenically unsaturated amide radical, an ethylenically unsaturated imide radical, an acrylamide radical, and a methacrylamide radical.

21. The method according to claim 13, wherein said unsaturated urethane radical is selected from the group consisting of acrylurethane, methacrylurethane, α-α' dimethyl-isopropenyl-benzylurethane, and allyl urethane.

22. The method according to claim 13, wherein R' represents a hydrocarbonated radical having 1 to 12 carbon atoms.

23. The method according to claim 13, wherein R' represents a hydrocarbonated radical having 1 to 4 carbon atoms.

24. The method according to claim 13, wherein R' represents a methyl radical.

25. The method according to claim 1, wherein said at least one polymer is at least one water-soluble copolymer that comprises as monomer units:
  1 to 20% by wt % of at least one vinylic monomer unit is selected from the group consisting of a (meth)acrylic acid monomer unit, a (meth)acrylic ester monomer unit, a (meth)acrylamide monomer unit, an aromatic vinylic monomer unit, and a monomer unit of a (meth)acrylic ester of a cationic compound; and
  80 to 99% of at least one non-ionic monomer unit represented by formula (I)

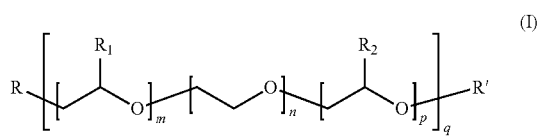

wherein
  m, n and p each individually represent a number less than or equal to 150,
  q represents an integer at least equal to 1 and such that 5≦(m+n+p)q≦150,
  $R_1$ and $R_2$ each independently represents hydrogen, a methyl radical, or an ethyl radical,
  R represents a radical containing a polymerizable unsaturated functional group, and
  R' represents hydrogen or a hydrocarbonated radical having 1 to 40 carbon atoms, and wherein
the weight percents are relative to the total mass of said monomer units.

26. The method according to claim 25, wherein said (meth)acrylic ester monomer unit is selected from the group consisting of an acrylate monomer unit having 1 to 20 carbon atoms in the ester radical and a methacrylate monomer unit having 1 to 20 carbon atoms in the ester radical.

27. The method according to claim 25, wherein said (meth)acrylic ester monomer unit is selected from the group consisting of methyl acrylate, ethyl acrylate, isopropyl acrylate, n-propyl acrylate, isobutyl acrylate, n-butyl acrylate, ter-butyl acrylate, 2-ethylhexyl acrylate, methyl methacrylate, ethyl methacrylate, hydroxyethyl methacrylate, and hydroxypropyl methacrylate.

28. The method according to claim 25, wherein said aromatic vinylic monomer unit is selected from the group consisting of styrene and α-methystyrene.

29. The method according to claim 25, wherein said monomer unit of a (meth)acrylic ester of a cationic compound is selected from the group consisting of [2-(methacryloyloxy)ethyl] trimethyl ammonium sulfate, [2-(methacryloyloxy)ethyl] trimethyl ammonium chloride, [2-(acryloyloxy)ethyl] trimethyl ammonium sulfate, [2-(acryloyloxy)ethyl] trimethyl ammonium chloride, [3-(acrylamido)propyl] trimethyl ammonium sulfate, [3-(acrylamido)propyl] trimethyl ammonium chloride, dimethyl diallyl ammonium sulfate, dimethyl diallyl ammonium chloride, [3-(methacrylamido)propyl] trimethyl ammonium sulfate, and [3-(methacrylamido)propyl] trimethyl ammonium chloride.

30. The method according to claim 25, wherein q represents an integer at least equal to 1 and such that 15≦(m+n+p)q≦120.

31. The method according to claim 25, wherein R is selected from the group consisting of a vinylic radical, an acrylic radical, a methacrylic radical, a maleic ester radical, an unsaturated urethane radical, an unsubstituted or substituted allylic ether, an unsubstituted or substituted vinylic ether, an ethylenically unsaturated amide, an ethylenically unsaturated imide, an acrylamide, and a methacrylamide.

32. The method according to claim 31, wherein said unsaturated urethane radical is selected from the group consisting of acrylurethane, methacrylurethane, α-α' dimethyl-isopropenyl-benzylurethane, and allylurethane.

33. The method according to claim 25, wherein R' represents a hydrocarbonated radical having 1 to 12 carbon atoms.

34. The method according to claim 25, wherein R' represents a hydrocarbonated radical having 1 to 4 carbon atoms.

35. The method according to claim 25, wherein R' represents a methyl radical.

36. The method according to claim 25, wherein the at least one vinylic monomer unit is at least one of an acrylic acid monomer unit and a methacrylic acid monomer unit.

37. The method according to claim 1, wherein said at least one polymer is totally or partially neutralized by at least one neutralization agent selected from the group consisting of calcium oxide, calcium hydroxide, magnesium oxide, magnesium hydroxide, barium oxide, barium hydroxide, lithium oxide, lithium hydroxide, sodium hydroxide, potassium hydroxide, ammonium hydroxide, a primary amine, a secondary amine and a tertiary amine.

38. The method according to claim 37, wherein said at least one polymer, before or after the total or partial neutralization reaction, is treated and separated into multiple phases, using static or dynamic processes, by at least one polar solvent selected from the group consisting of water, methanol, ethanol, propanol, isopropanol, a butanol, acetone, and tetrahydrofuran.

39. The method according to claim 1, wherein the at least one polymer is obtained by a method of radical polymerization in a solution, in a direct or reverse emulsion, in a suspension or precipitation in solvents, in the presence of catalytic systems and transfer agents, or by a controlled radical polymerization methods selected from the group consisting of nitroxide-mediated polymerization (NMP), cobaloxime-mediated polymerization, atom transfer radical polymerization (ATRP), and sulfur compound-mediated radical polymerization, wherein said sulfur compound is selected from the group consisting of a carbamate, a dithioester, a trithiocarbonate, and a xanthate.

40. The method according to claim 1, wherein a thickening agent is present during, after, or during and after said treating.

41. A powder comprising at least one metallic hydroxide and at least one metallic oxide and at least one polymer selected from the group consisting of a homopolymer and a water-soluble copolymer having at least one vinylic monomer unit, wherein:
  said at least one metallic hydroxide is present in an amount by dry weight of less than 99%.

42. The powder according to claim 41, wherein said at least one metallic hydroxide is present in an amount by dry weight of less than 75% of the total weight thereof.

43. The powder according to claim 41, wherein said at least one metallic hydroxide is present in an amount by dry weight of less than 50% of the total weight thereof.

44. The powder according to claim 41, wherein said at least one metallic hydroxide is present in an amount by dry weight of less than 10% of the total weight thereof.

45. The powder according to claim 41, wherein said at least one metallic oxide is selected from the group consisting of calcium oxide, magnesium oxide, copper oxide, zinc oxide, and iron oxide.

46. The powder according to claim 45, wherein said at least one metallic oxide is selected from the group consisting of calcium oxide and magnesium oxide.

47. The powder according to claim 41, wherein said at least one vinylic monomer unit is selected from the group consisting of a (meth)acrylic acid monomer unit, a (meth)acrylic ester monomer unit, a (meth)acrylamide monomer unit, an aromatic vinylic monomer unit, and a monomer unit of a (meth)acrylic ester of a cationic compound.

48. The powder according to claim 47, wherein said (meth) acrylic ester monomer unit is selected from the group consisting of an acrylate monomer unit having 1 to 20 carbon atoms and a methacrylate monomer unit having 1 to 20 carbon atoms.

49. The powder according to claim 47, wherein said (meth) acrylic ester monomer unit is selected from the group consisting of methyl acrylate, ethyl acrylate, isopropyl acrylate, n-propyl acrylate, isobutyl acrylate, n-butyl acrylate, ter-butyl acrylate, 2-ethylhexyl acrylate, methyl methacrylate, ethyl methacrylate, hydroxyethyl methacrylate, and hydroxypropyl methacrylate.

50. The powder according to claim 47, wherein said aromatic vinylic monomer unit is selected from the group consisting of styrene and α-methystyrene.

51. The powder according to claim 47, wherein said monomer unit of a (meth)acrylic ester of a cationic compound is selected from the group consisting of [2-(methacryloyloxy) ethyl] trimethyl ammonium sulfate, [2-(methacryloyloxy) ethyl] trimethyl ammonium chloride, [2-(acryloyloxy)ethyl] trimethyl ammonium sulfate, [2-(acryloyloxy)ethyl] trimethyl ammonium chloride, [3-(acrylamido)propyl] trimethyl ammonium sulfate, [3-(acrylamido)propyl] trimethyl ammonium chloride, dimethyl diallyl ammonium sulfate, dimethyl diallyl ammonium chloride, [3-(methacrylamido)propyl] trimethyl ammonium sulfate, and [3-(methacrylamido)propyl] trimethyl ammonium chloride.

52. The powder according to claim 41, wherein the at least one vinylic monomer unit is at least one of an acrylic acid monomer unit and a methacrylic acid monomer unit.

53. The powder according to claim 41, wherein
said at least one metallic oxide selected from the group consisting of calcium oxide and magnesium oxide; and
said at least one vinylic monomer unit is selected from the group consisting of a (meth)acrylic acid monomer unit, a (meth)acrylic ester monomer unit, a (meth)acrylamide monomer unit, an aromatic vinylic monomer unit, a monomer unit of a (meth)acrylic ester of a cationic compound, and a non-ionic monomer unit represented by formula (I)

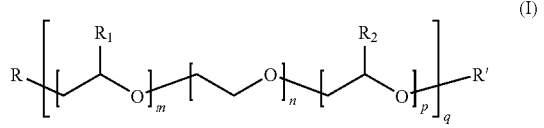

wherein
m, n and p each individually represent a number less than or equal to 150,
q represents an integer at least equal to 1 and such that $5 \leq (m+n+p)q \leq 150$,
$R_1$ and $R_2$ each independently represents hydrogen, a methyl radical, or an ethyl radical,
R represents a radical containing a polymerizable unsaturated functional group, and
R' represents hydrogen or a hydrocarbonated radical having 1 to 40 carbon atoms.

54. The powder according to claim 53, wherein said (meth) acrylic ester monomer unit is selected from the group consisting of an acrylate monomer unit having 1 to 20 carbon atoms in the ester radical and a methacrylate monomer unit having 1 to 20 carbon atoms in the ester radical.

55. The powder according to claim 53, wherein said (meth) acrylic ester monomer unit is selected from the group consisting of methyl acrylate, ethyl acrylate, isopropyl acrylate, n-propyl acrylate, isobutyl acrylate, n-butyl acrylate, ter-butyl acrylate, 2-ethylhexyl acrylate, methyl methacrylate, ethyl methacrylate, hydroxyethyl methacrylate, and hydroxypropyl methacrylate.

56. The powder according to claim 53, wherein said aromatic vinylic monomer unit is selected from the group consisting of styrene and α-methystyrene.

57. The powder according to claim 53, wherein said monomer unit of a (meth)acrylic ester of a cationic compound is selected from the group consisting of [2-(methacryloyloxy) ethyl] trimethyl ammonium sulfate, [2-(methacryloyloxy) ethyl] trimethyl ammonium chloride, [2-(acryloyloxy)ethyl] trimethyl ammonium sulfate, [2-(acryloyloxy)ethyl] trimethyl ammonium chloride, [3-(acrylamido)propyl] trimethyl ammonium sulfate, [3-(acrylamido)propyl] trimethyl ammonium chloride, dimethyl diallyl ammonium sulfate, dimethyl diallyl ammonium chloride, [3-(methacrylamido)propyl] trimethyl ammonium sulfate, and [3-(methacrylamido)propyl] trimethyl ammonium chloride.

58. The powder according to claim 53, wherein the at least one vinylic monomer unit is at least one of an acrylic acid monomer unit and a methacrylic acid monomer unit.

59. The powder according to claim 53, wherein q represents an integer at least equal to 1 and such that $15 \leq (m+n+p)q \leq 120$.

60. The powder according to claim 53, wherein R is selected from the group consisting of a vinylic radical, an acrylic radical, a methacrylic radical, a maleic ester radical, an unsaturated urethane radical, an unsubstituted or substituted allylic ether radical, an unsubstituted or substituted vinylic ether radical, an ethylenically unsaturated amide radical, an ethylenically unsaturated imide radical, an acrylamide radical, and a methacrylamide radical.

61. The powder according to claim 60, wherein said unsaturated urethane radical is selected from the group consisting of acrylurethane, methacrylurethane, α-α' dimethyl-isopropenyl-benzylurethane, and allylurethane.

62. The powder according to claim 53, wherein R' represents a hydrocarbonated radical having 1 to 12 carbon atoms.

63. The powder according to claim 53, wherein R' represents a hydrocarbonated radical having 1 to 4 carbon atoms.

64. The powder according to claim 53, wherein R' represents a methyl radical.

65. The powder according to claim 41, wherein said at least one polymer is at least one water-soluble copolymer that comprises as monomer units:
1 to 20% by wt % of at least one vinylic monomer unit is selected from the group consisting of a (meth)acrylic acid monomer unit, a (meth)acrylic ester monomer unit, a (meth)acrylamide monomer unit, an aromatic vinylic monomer unit, and a monomer unit of a (meth)acrylic ester of a cationic compound; and 80 to 99% of at least one non-ionic monomer unit represented by formula (I)

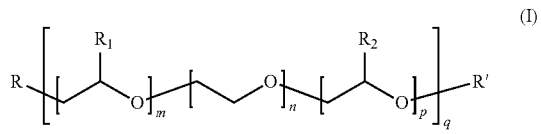

wherein
- m, n and p each individually represent a number less than or equal to 150,
- q represents an integer at least equal to 1 and such that $5 \leq (m+n+p)q \leq 150$,
- $R_1$ and $R_2$ each independently represents hydrogen, a methyl radical, or an ethyl radical,
- R represents a radical containing a polymerizable unsaturated functional group, and
- R' represents hydrogen or a hydrocarbonated radical having 1 to 40 carbon atoms, and wherein the weight percents are relative to the total mass of said monomer units.

66. The powder according to claim 65, wherein said (meth)acrylic ester monomer unit is selected from the group consisting of an acrylate monomer unit having 1 to 20 carbon atoms in the ester radical and a methacrylate monomer unit having 1 to 20 carbon atoms in the ester radical.

67. The powder according to claim 65, wherein said (meth)acrylic ester monomer unit is selected from the group consisting of methyl acrylate, ethyl acrylate, isopropyl acrylate, n-propyl acrylate, isobutyl acrylate, n-butyl acrylate, ter-butyl acrylate, 2-ethylhexyl acrylate, methyl methacrylate, ethyl methacrylate, hydroxyethyl methacrylate, and hydroxypropyl methacrylate.

68. The powder according to claim 65, wherein said aromatic vinylic monomer unit is selected from the group consisting of styrene and α-methystyrene.

69. The powder according to claim 65, wherein said monomer unit of a (meth)acrylic ester of a cationic compound is selected from the group consisting of [2-(methacryloyloxy)ethyl] trimethyl ammonium sulfate, [2-(methacryloyloxy)ethyl] trimethyl ammonium chloride, [2-(acryloyloxy)ethyl] trimethyl ammonium sulfate, [2-(acryloyloxy)ethyl] trimethyl ammonium chloride, [3-(acrylamido)propyl] trimethyl ammonium sulfate, [3-(acrylamido)propyl] trimethyl ammonium chloride, dimethyl diallyl ammonium sulfate, dimethyl diallyl ammonium chloride, [3-(methacrylamido)propyl] trimethyl ammonium sulfate, and [3-(methacrylamido)propyl] trimethyl ammonium chloride.

70. The powder according to claim 65, wherein q represents an integer at least equal to 1 and such that $15 \leq (m+n+p)q \leq 120$.

71. The powder according to claim 65, wherein R is selected from the group consisting of a vinylic radical, an acrylic radical, a methacrylic radical, a maleic ester radical, an unsaturated urethane radical, an unsubstituted or substituted allylic ether, an unsubstituted or substituted vinylic ether, an ethylenically unsaturated amide, an ethylenically unsaturated imide, an acrylamide, and a methacrylamide.

72. The powder according to claim 71, wherein said unsaturated urethane radical is selected from the group consisting of acrylurethane, methacrylurethane, α-α' dimethyl-isopropenyl-benzylurethane, and allylurethane.

73. The powder according to claim 65, wherein R' represents a hydrocarbonated radical having 1 to 12 carbon atoms.

74. The powder according to claim 65, wherein R' represents a hydrocarbonated radical having 1 to 4 carbon atoms.

75. The powder according to claim 65, wherein R' represents a methyl radical.

76. The powder according to claim 65, wherein the at least one vinylic monomer unit is at least one of an acrylic acid monomer unit and a methacrylic acid monomer unit.

77. The powder according to claim 41, wherein said at least one polymer is totally or partially neutralized by at least one neutralization agent selected from the group consisting of calcium oxide, calcium hydroxide, magnesium oxide, magnesium hydroxide, barium oxide, barium hydroxide, lithium oxide, lithium hydroxide, sodium hydroxide, potassium hydroxide, ammonium hydroxide, a primary amine, a secondary amine and a tertiary amine.

78. The powder according to claim 77, wherein said at least one polymer, before or after the total or partial neutralization reaction, is treated and separated into multiple phases, using static or dynamic processes, by at least one polar solvent selected from the group consisting of water, methanol, ethanol, propanol, isopropanol, a butanol, acetone, and tetrahydrofuran.

79. The powder according to claim 41, wherein the at least one polymer is obtained by a method of radical polymerization in a solution, in a direct or reverse emulsion, in a suspension or precipitation in solvents, in the presence of catalytic systems and transfer agents, or by a controlled radical polymerization methods selected from the group consisting of nitroxide-mediated polymerization (NMP), cobaloxime-mediated polymerization, atom transfer radical polymerization (ATRP), and sulfur compound-mediated radical polymerization, wherein said sulfur compound is selected from the group consisting of a carbamate, a dithioester, a trithiocarbonate, and a xanthate.

80. An aqueous dispersion comprising the powder according to claim 41.

81. The aqueous dispersion according to claim 80, wherein said at least one metallic oxide is selected from the group consisting of calcium oxide, magnesium oxide, copper oxide, zinc oxide, and iron oxide.

82. The aqueous dispersion according to claim 81, wherein said at least one metallic oxide is selected from the group consisting of calcium oxide and magnesium oxide.

83. A process of treating a waste selected from the group consisting of household waste, industrial waste, gaseous waste, and acidic fumes comprising treating said waste with the aqueous dispersion according to claim 80.

84. A composition operable as a chemical reagent or a soil amendment comprising the aqueous dispersion according to claim 80.

* * * * *